United States Patent [19]
Meade et al.

[11] Patent Number: 5,928,687
[45] Date of Patent: Jul. 27, 1999

[54] RUMEN BY-PASS FEED SUPPLEMENT

[75] Inventors: Thomas L. Meade, Saunderstown, R.I.; Richard C. Plakias, Southwick; John C. Auth, Amherst, both of Mass.

[73] Assignee: Long Trail Enterprises, Inc., Springfield, Mass.

[21] Appl. No.: 08/846,566

[22] Filed: Apr. 30, 1997

Related U.S. Application Data

[63] Continuation-in-part of application No. 08/181,679, Jan. 14, 1994, abandoned.

[51] Int. Cl.$^6$ ....................................................... A23K 1/18
[52] U.S. Cl. ................................ 426/2; 426/807; 426/98; 424/438
[58] Field of Search ............................... 426/2, 807, 98; 424/438

[56] References Cited

U.S. PATENT DOCUMENTS

| | | |
|---|---|---|
| 2,472,663 | 6/1949 | Kleine et al. . |
| 2,744,824 | 5/1956 | Lent . |
| 2,758,027 | 8/1956 | Gillis . |
| 2,793,952 | 5/1957 | Rawlings . |
| 2,831,769 | 4/1958 | Kamlet . |
| 3,056,724 | 10/1962 | Marston . |
| 3,265,629 | 8/1966 | Jensen . |
| 3,619,200 | 11/1971 | Ferguson . |
| 3,656,908 | 4/1972 | Buck . |
| 3,711,290 | 1/1973 | Miller . |
| 3,718,478 | 2/1973 | Wildi et al. . |
| 3,726,971 | 4/1973 | Miller . |
| 3,762,972 | 10/1973 | Allen . |
| 3,829,564 | 8/1974 | Merry et al. . |
| 3,904,775 | 9/1975 | Harwood . |
| 3,925,560 | 12/1975 | Scott et al. . |
| 3,959,493 | 5/1976 | Baalsrud . |
| 3,966,998 | 6/1976 | Rawlings et al. . |
| 3,989,851 | 11/1976 | Hawley . |
| 4,016,296 | 4/1977 | DeSantis . |
| 4,039,689 | 8/1977 | Bone . |
| 4,062,988 | 12/1977 | DeSantis . |
| 4,120,980 | 10/1978 | Merget et al. . |
| 4,196,187 | 4/1980 | Donnelly . |
| 4,203,892 | 5/1980 | Friedman . |
| 4,216,234 | 8/1980 | Rawlings et al. . |
| 4,217,370 | 8/1980 | Rawlings et al. . |
| 4,225,620 | 9/1980 | Rawlings et al. . |
| 4,248,899 | 2/1981 | Lyon et al. . |
| 4,533,557 | 8/1985 | Maruyama et al. . |
| 4,687,676 | 8/1987 | Wu et al. . |
| 4,713,245 | 12/1987 | Ando et al. . |
| 4,808,412 | 2/1989 | Smith et al. . |
| 4,824,679 | 4/1989 | Freeman . |
| 4,826,694 | 5/1989 | McAskie . |
| 4,837,004 | 6/1989 | Wu et al. ................................ 424/438 |
| 4,853,233 | 8/1989 | McAskie . |
| 4,863,455 | 9/1989 | Whitehead . |
| 4,877,621 | 10/1989 | Ardaillon et al. . |
| 5,023,091 | 6/1991 | Winowiski . |
| 5,064,665 | 11/1991 | Klopfenstein et al. . |
| 5,093,128 | 3/1992 | Dreguesku et al. ..................... 424/438 |
| 5,206,041 | 4/1993 | Wellons . |
| 5,212,325 | 5/1993 | Lajore ...................................... 554/156 |
| 5,425,963 | 6/1995 | Lajore .......................................... 426/2 |

FOREIGN PATENT DOCUMENTS 1154294  9/1983  Canada .

*Primary Examiner*—Chhaya D. Sayala
*Attorney, Agent, or Firm*—Synnestvedt & Lechner LLP

[57] ABSTRACT

A rumen by-pass feed supplement in the form of a matrix containing up to about 70 percent by weight of at least one biologically active material susceptible to inactivation in the rumen, and a protective substance which is a glyceride-free mixture of aliphatic fatty acids having an Iodine Value between 10 and 20, in an amount effective to both form a fatty acid matrix with the biologically active material and a surface coating impervious to attack in the rumen. Ruminant feeds containing the rumen by-pass feed supplements are also disclosed, as well as processes for supplying the rumen by-pass feed supplements to ruminant animals.

20 Claims, No Drawings

RUMEN BY-PASS FEED SUPPLEMENT

CROSS-REFERENCE TO RELATED APPLICATIONS

This application is a Continuation-In-Part of U.S. patent application Ser. No. 08/181,679 filed Jan. 14, 1994, now abandoned the disclosure of which is incorporated herein by reference thereto.

FIELD OF THE INVENTION

The present invention relates to feed additives to ruminants.

BACKGROUND OF THE INVENTION

The rumen, the largest of the four stomach compartments of ruminants, is the site of digestive breakdown of ingested foodstuffs. Absorption of most nutrients for metabolic uptake by the animal, however, takes place further along in the alimentary tract, principally in the abomasum and intestines. Although the rumen endows the animal with the capacity to digest and utilize cellulose effectively, it is relatively inefficient in the digestion and utilization of dietary protein. Ingested food is retained in the rumen from between about 12 to 30 hours during which time it is subject to digestive breakdown by microbes and the rumen fluid. Protein and amino acids present in the diet are degraded and then become solubilized in the rumen liquid phase whereupon they are metabolized by the microbes as a convenient source of nutrition. Thus, most of the dietary protein and amino acids are diverted from the intended metabolic pathways of the ruminant.

In view of the inefficiency of protein conversion in ruminants, the supplementation of the ruminant diet with additional protein has become common practice. Supplemental protein is needed especially during periods of lactation and stress. To enhance efficiency, feed compositions have been modified to permit passage of the protein through the rumen in non-degraded, active form. Modifications have included coating the protein, e.g., with fats, fat or vegetable oils, polymers, or an acid sensitive coating; heat treatment; dispersing the active material in a polymeric matrix; and reacting the material with various compounds such as formaldehyde, acetylenic esters, polymerized unsaturated carboxylic acid or anhydrides, and phosphonitrilic halides. More specifically, U.S. Pat. No. 4,826,694 (McAskie) discloses a by-pass supplement wherein the proteinaceous feed additives are blended with a water-insoluble salt of one or more edible higher fatty acids. U.S. Pat. No. 4,533,557 (Maruyama et al.) discloses ruminant feed additives in the form of tablets or granules which contain a mixture of biologically active ingredients, chitosan and protective materials selected from saturated and unsaturated aliphatic fatty acids having from 14 to 22 carbon atoms, hardened vegetable oils and animal oils. Chitosan is disclosed as promoting the digestion of the active ingredient in the abomasum, while contributing resistance to degradation in the rumen.

U.S. Pat. No. 4,713,245 (Ando et al.) discloses granular ruminant feeds wherein a physiologically active substance is coated with an acid-sensitive substance and at least one other material selected from saturated and unsaturated fatty acids having at least 14 carbon atoms and salts thereof, animal or vegetable fats, and waxes, each having a melting point of at least 40° C. Japanese Patent Laid-open 154956/1981 discloses a biologically effective granular substance coated with a mixture of saturated and unsaturated fatty acids having from 14–22 carbon atoms and salts thereof.

U.S. Pat. No. 3,959,493 (Baalsrud) discloses a rumen by-pass feed supplement comprising a biologically active material such as a carbohydrate, amino acid, fat or fatty acid, coated with or at least partly enclosed in a matrix of a rumen-resistant, saturated or unsaturated fatty acid having at least 14 carbon atoms, or a mixture thereof, or a salt of the acid or acid mixture. Baalsrud discloses feed supplements in which the fatty acid matrix consists entirely of saturated fatty acids, which would have limited bioavailability to the ruminant, and would instead provide a laxating effect, as well as feed supplements in which as much as one-half of the fatty acid matrix component is an unsaturated fatty acid, which would be too soft to form a commercially acceptable particle for feeding to a ruminant, such as a pellet, prill, and the like.

A need remains for a nutritionally efficient rumen by-pass feed supplement that is easily prepared on a large scale.

SUMMARY OF THE INVENTION

Applicants have unexpectedly discovered that by coating a biologically active material with a glyceride-free fatty acid mixture having an Iodine Value between 10 and 20, a rumen by-pass feed supplement is obtained having a protective matrix that is hard enough at room temperature to permit the product to be formed into a commercially acceptable stable particle having the shape of a pellet, prill, and the like, and yet at the same time, the protective matrix is soft enough that it is also bioavailable as a source of nutrition for the ruminant. The rumen by-pass feed supplements of the present invention thus overcome various disadvantages associated with prior art ruminant feed supplements.

In accordance with this discovery, the disclosed invention provides a rumen by-pass feed supplement containing:
(a) up to about 70 percent by weight of at least one biologically active material susceptible to inactivation in the rumen, and
(b) a protective substance consisting of a glyceride-free mixture of fatty acids having an Iodine Value between 10 and 20 in an amount effective to both form a fatty acid matrix with the biologically active material and a surface coating impervious to attack in the rumen of the ruminant.

Because the protective substance is present in the supplement in an amount effective to form a surface coating for the biologically active material impervious to attach in the rumen, the biologically active material is prevented from being inactivated in the rumen. Because the inactivation of the biologically active material in the rumen is prevented, the nutritional benefit of the feed to the ruminant is enhanced significantly. Ruminants fed with the disclosed supplements exhibit increased growth and milk production.

Therefore, the present invention also provides a process for supplying fatty acids and other nutrients to ruminant animals by feeding to the ruminant animals the rumen by-pass feed supplement of the present invention in an amount equal to at least about one percent of the dry matter content of the animals' feed. The rumen by-pass feed supplement should not exceed about 10 percent of the dry matter content of the feed. The present invention thus also provides a ruminant feed containing at least one vegetable material and at least about one percent by weight on a dry solids basis of the rumen by-pass feed supplement of the present invention.

DETAILED DESCRIPTION OF THE INVENTION

The rumen by-pass feed supplements of the present invention contain at least one biologically active material in a protective matrix of a glyceride-free mixture of aliphatic fatty acids having from 12 to 22 carbon atoms, which mixture has an Iodine Value between 10 and 20. Each matrix contains a plurality of particulate biologically active materials substantially coated with the protective substance.

By the term "biologically active material", it is meant any substance capable of being administered orally in a feed composition and which is susceptible to inactivation in the rumen, for example, as a result of degradation by microbes and digestive juices. The material should also not be susceptible to being leached out through the protective substance by the digestive juices of the rumen. Representative types of such materials include proteins, carbohydrates and fats. Suitable proteins are blood meal, crab protein concentrate, fish meal, hydrolyzed poultry feather meal, soy bean meal, soy bean protein concentrate, sunflower seed meal, cotton seed meal, corn gluten meal, alfalfa residues, brewer's residues, meat and bone meal, meat meal, canola meal, poultry by-product meal, potato protein, safflower meal, milk whey, egg albumin, and other animal or vegetable tissues and fluids, and mixtures thereof. Casein may also be used, and amino acids such as lysine and methionine. Carbohydrates commonly employed in ruminant feed compositions include starch, sucrose, glucose and glucose precursors. Suitable fats include triglycerides of fatty acids.

Proteinaceous materials containing lysine and methionine are particularly preferred, for the dietary supplementation of high milk producing ruminants. Such proteinaceous materials include blood meal, fish meal, meat and bone meal and meat meal.

The protective substance prevents inactivation of the biologically active material while the feed supplement passes through the rumen in the course of digestion. It allows for the assimilation or metabolic uptake of the biologically active material by the ruminant in the post-rumen portions of the digestive tract, namely the abomasum and the lower gut. The protective substance is a glyceride-free mixture of aliphatic fatty acids having from 12 to 22 carbon atoms and an Iodine Value between 10 and 20. Salts, e.g., metal salts, of the fatty acids are not included within the scope of the present invention.

The importance of using a glyceride-free fatty acid mixture having an Iodine Value between 10 and 20 has not been recognized by the prior art. Fatty acid mixtures having an Iodine Value less than 10 are unsuitable for use with the present invention because they are lacking in bioavailability and function more effectively as a laxative. Fatty acid mixtures having an Iodine Value greater than 20 are also unsuitable for use with the present invention because they form a protective matrix coating that is too soft to be shaped into a commercially acceptable particle such as a pellet, prill, or the like. An Iodine Value between about 15 and about 18 is preferred.

At least 40 percent by weight of the fatty acid mixture component of the inventive feed supplement is preferably palmitic acid. A palmitic acid level between about 40 and about 50 percent by weight is even more preferred. Most preferably, the fatty acid mixture also contains between about 45 and about 55 percent by weight of two or more fatty acids selected from stearic, oleic and linoleic acids. At least 95 percent by weight, and preferably at least 98 percent by weight, of the fatty acid mixture component of the inventive feed supplement are fatty acids having between 14 and 18 carbon atoms.

The present invention incorporates the discovery that by using glyceride-free fatty acid mixtures, a higher degree of rumen protection is provided for the biologically active materials protected by the fatty acid mixture. Glyceride esters of fatty acids have a greater tendency to emulsify in the aqueous environment of the rumen, thereby rendering the biologically active materials susceptible to inactivation in the rumen.

Defining the glyceride-free fatty acid mixtures as being "protective substances" and the materials capable of being inactivated in the rumen as being "biologically active materials" is not meant to imply that the fatty acids are not biologically active. In fact, over 90 percent of the protective substance is utilized by the ruminant. Referring to the glyceride-free fatty acid mixtures as "protective substances" defines the role served by the fatty acids in the feed supplement and distinguishes the fatty acids over the feed supplement ingredients susceptible to inactivation in the rumen. The rumen by-pass feed supplements of the present invention thus uniquely protect the biologically active material with a coating matrix that is also a significant source of energy that functions independently as a nutritional supplement.

The source of the individual fatty acids of the glyceride-free fatty acid mixture is not critical. Each fatty acid may be purchased individually from a refiner, and thus may each come from different animal and vegetable sources. When animal sources are used, it will be necessary to supplement the animal fatty acids with palmitic acid to obtain the preferred products of the present invention in which the fatty acid mixture has a minimum palmitic acid level of 40 percent by weight. For example, if a mixture of glyceride-free fatty acids are employed derived from hydrogenated tallow, it will be necessary to supplement this mixture with palmitic acid to obtain a minimum palmitic acid level of 40 percent by weight of the fatty acid mixture.

The rumen by-pass feed supplements of the present invention contain up to about 70 percent by weight of the at least one biologically active material. In a more preferred embodiment, the amount of the material is no more than 60 percent by weight, and most preferably is about 50 percent by weight. The amount of the glyceride-free fatty acid mixture is between about 30 percent and about 50 percent of the total weight of the feed supplement, and more preferably, about 40 percent by total weight.

The rumen by-pass feed supplement may optionally contain additional ingredients such as flavoring agents, antioxidants and chelating agents. In a preferred embodiment, molasses is used as a flavoring agent at levels up to about 20 percent and preferably up to about 10 percent by weight. Those skilled in the art will be able to select these additional ingredients as needed. However, the preferred compositions of the present invention have been found not to require the addition of molasses or other flavoring agents to induce consumption by ruminants.

The feed of the present invention has several unexpected advantages compared to known ruminant feed compositions. While not being bound by any particular theory, the glyceride-free fatty acid mixtures with Iodine Values between 10 and 20 possess optimal surface wetting properties compared to fatty acid salts, unsaturated fatty acids and salts thereof. It is believed that this optimization of surface wetting provides a more complete encapsulation of the biologically active material.

Furthermore, in addition to forming a fatty acid matrix with biologically active material, the glyceride-free fatty acids also form a surface coating impervious to attack in the rumen. This is attributable to the hydrophobic nature of the free fatty acids in comparison to glyceride esters, which tend to emulsify in the aqueous environment of the rumen. The advantages are particularly evidenced in the case when the biologically active material is a protein, which, when encapsulated by the fatty acid mixtures of the present invention, reaches the abomasum and lower intestines substantially non-degraded where it is then metabolized by the ruminant. Therefore, its nutritional value is optimized such that ruminants fed with the compositions of the invention have increased growth and milk production rates.

A typical rumen by-pass feed supplement contains the following ingredients. "Fatty Acid Mixture" refers to the glyceride-free fatty acid mixture having an Iodine Value between 10 and 20 of the present invention.

TABLE I

| INGREDIENT | WEIGHT % |
| --- | --- |
| Soy Bean Meal | 10%–60% |
| Fatty Acid Mixture | 40%–90% |

In Table II, a preferred supplement is set forth:

TABLE II

| INGREDIENT | WEIGHT % |
| --- | --- |
| Soy Bean Meal | 50% |
| Fatty Acid Mixture | 50% |

A particularly preferred fatty acid mixture contains per 100 parts by weight of the mixture, 45 parts by weight of palmitic acid, 33 parts by weight of stearic acid, 14 parts by weight of oleic acid and 1.5 parts by weight of linoleic acid, with the balance being other saturated and unsaturated fatty acids having between 12 and 22 carbon atoms.

The rumen by-pass feed supplements of the present invention may conveniently be fed to a ruminant admixed with a conventional ruminant feed. The feeds are typically vegetable materials edible by ruminants, such as legume hay, grass hay, corn silage, grass silage, legume silage, corn grain, oats, barley, distiller's grain, brewer's grain, soya bean meal and cotton seed meal. Desirably, the amount of the feed supplement in such an admixture does not exceed about 10 percent of the dry solids content of the feed and is preferably about 3 to 5 percent of the dry solids content of the feed.

There is no particular lower limit for the amount of the feed supplement to be added to the ruminant feed, although in practice amounts of the feed supplement below about 1 percent of the dry solids content of the feed are too small to provide significant amounts of energy to the ruminant. It is known to feed small amounts of fatty acid mixtures to cattle only as an inert protective agent for certain feed supplements such as methionine, as is disclosed in the aforementioned U.S. Pat. No. 3,959,493. However, the amounts of fatty acids fed to cattle in this manner are much smaller than contemplated with the feed supplements of the present invention.

The feed supplements of the present invention are ideal nutritional supplements for cattle, particularly lactating dairy cattle, for which conventional cattle feeds, such as corn and alfalfa, often fail to provide sufficient energy, especially during periods of heavy milk production. Accordingly, the rumen by-pass feed supplements of the present invention are particularly well-suited for use as nutritional supplemental additives for cattle feeds.

To prepare the rumen by-pass feed compositions of the present invention, predetermined amounts of the glyceride-free fatty acid mixture and the biologically active material(s) are mixed together and preheated to a temperature at which the mixture is fluid, which temperature can be readily determined without undue experimentation by one of ordinary skill in the art. For the glyceride-free fatty acid mixtures of the present invention, this temperature is typically at about or above 135° F. Preferably, the mixing temperature is at about 135° F. to minimize energy consumption and maximize manufacturing throughput. At higher temperatures, longer cooling times are required, which reduces production efficiency. The heating is performed with continuous agitation.

The mixing and preheating can be done in any suitable apparatus known in the relevant arts, typically stainless steel jacketed tanks with side scrapers. To coat the biologically active material with the protective substance, the uniform homogeneous mixture then is forced through a shaped orifice, preferably with cooling, to a semi-solid form. The temperature below which this occurs can also be readily determined without undue experimentation by one of ordinary skill in the art. For the glyceride-free fatty acid mixtures of the present invention, this temperature is below 135° F., and preferably about 128° F.

This step can be practiced advantageously with a forming device known as a Rotoformer, available from Sandvik, Inc. of Totowa, N.J. The uniform, homogeneous mixtures cools and begins to solidify in the Rotoformer, through which droplets may be forced onto a stainless steel cooling belt, which is operated at a speed that permits a cooled, completely baggable solid product to be discharged from the end of the belt. This speed can be readily determined by one of ordinary skill in the art, again without undue experimentation, with hotter product requiring a slower belt speed to permit adequate time for cooling. It can thus be appreciated that the product being discharged onto the cooling belt should be at the lowest possible temperature at which the Rotoformer will efficiently operate, to permit the belt to be operated at as high a speed as possible. Subsequent to shaping, the feed can be packaged and stored.

Ruminant feed supplements produced by the disclosed process offer several other unexpected benefits, in addition to protection of the active material. By having an Iodine Value between 10 and 20, the relative hardness of the fatty acid mixtures of the instant invention compared to their more unsaturated counterparts results in a more stable, coherent matrix. Once shaped into forms suitable for oral administration, the individual matrices can be packaged in bulk, transported, and stored for long periods of time without loosing their shape, yet at the same time the fatty acid mixtures are soft enough to be bioavailable to the ruminant and function as a source of nutrition in addition to biologically active material that they serve to protect in the rumen. Glyceride-free acid mixtures having Iodine Values between 10 and 20 provide the rumen by-pass feed supplements of the present invention with a heretofore unappreciated fatty acid bioavailability in addition to protection of biologically active materials susceptible to inactivation in the rumen.

Prior art feed supplements containing higher Iodine Value fatty acids, on the other hand, are softer and more susceptible to agglomeration or "blocking", particularly during prolonged storage. In addition, since the fatty acid mixtures of the present invention can be easily formed into a specifically shaped matrix, a relatively small amount of the protective substance is required to prepare the feed compared to the amounts of unsaturated fatty acids used in conventional compositions.

While the invention has been described in terms of various preferred embodiments, it will be clear to those skilled in the art that changes and modifications can be made therein without departing from the spirit and scope of the invention.

What is claimed is:

1. A rumen by-pass feed supplement for oral administration to a ruminant in the form of a matrix comprising:
    (a) up to about 70 percent by weight of at least one biologically active material susceptible to inactivation in the rumen, and
    (b) a protective substance consisting essentially of a glyceride-free mixture of aliphatic fatty acids having an Iodine Value between 10 and 20 in an amount effective to both form a fatty acid matrix with said biologically active material and a surface coating impervious to attack in the rumen of the ruminant.

2. The by-pass feed supplement of claim 1, wherein said biologically active material is a carbohydrate or a triglyceride of a fatty acid.

3. The by-pass feed supplement of claim 1, wherein said biologically active material is a protein.

4. The by-pass feed supplement of claim 3, wherein said protein is at least one member selected from the group consisting of blood meal, crab protein concentrate, fish meal, hydrolyzed poultry feather meal, soybean meal, soybean protein concentrate, sunflower seed meal, cotton seed meal, corn gluten meal, alfalfa residues, brewer's residues, meat and bone meal, meat meal, canola meal and poultry by-product meal.

5. The by-pass feed supplement of claim 4, wherein said protein is at least one member selected from the group consisting of blood meal, fish meal, meat and bone meal and meat meal.

6. The by-pass feed supplement of claim 3, wherein said protein is at least one member selected from the group consisting of casein, lysine and methionine.

7. The by-pass feed supplement of claim 1, wherein said glyceride-free mixture of aliphatic fatty acids comprises a minimum of 40 percent by weight of palmitic acid.

8. The by-pass feed supplement of claim 7, wherein said glyceride-free mixture of aliphatic fatty acids comprises between about 40 and about 50 percent by weight of palmitic acid.

9. The by-pass feed supplement of claim 7, wherein said glyceride-free mixture of aliphatic fatty acids comprises between about 45 and about 55 parts by weight of two or more fatty acids selected from the group consisting of stearic acid, oleic acid and linoleic acid.

10. The by-pass feed supplement of claim 1, containing up to about 60 percent by weight of at least one biologically active material.

11. The by-pass feed supplement of claim 10, containing up to about 50 percent by weight of at least one biologically active material.

12. A process for supplying a nutrient to ruminant animals capable of being inactivated in the rumen of said animals, which comprises feeding to said animals the rumen by-pass feed supplement of claim 1 in an amount equal to at least about one percent of the dry matter content of said animals' feed.

13. The process of claim 12, wherein said animals are cattle.

14. The process of claim 13, wherein said animals are lactating dairy cattle.

15. The process of claim 12, wherein said rumen by-pass feed supplement is added to said feed in an amount not exceeding about 10 percent of the dry matter content of said feed.

16. The process of claim 15, wherein said rumen by-pass feed supplement is added to said feed in an amount between about 3 and about 5 percent of the dry matter content of said feed.

17. A ruminant feed comprising at least one vegetable material edible by ruminants and the rumen by-pass feed product of claim 1, said rumen by-pass feed supplement comprising at least about 1 percent of the dry matter content of said feed.

18. The ruminant feed of claim 17, wherein said vegetable material is selected from the group consisting of legume hay, grass hay, corn silage, grass silage, legume silage, corn grain, oats, barley, distiller's grain, brewer's grain, soya bean meal and cotton seed meal.

19. The ruminant feed of claim 17, wherein said rumen by-pass feed supplement is present in an amount of not more than about 10 percent of the dry solids content of said feed.

20. The ruminant feed of claim 19, wherein said rumen by-pass feed supplement is present in an amount between about 3 and about 5 percent of the dry matter content of said feed.

* * * * *